United States Patent [19]

Takagi et al.

[11] 3,970,378

[45] July 20, 1976

[54] MOVIE CAMERA CAPABLE OF MAGNETIC RECORDING SIMULTANEOUSLY WITH FILMING

[75] Inventors: Katsuhide Takagi, Okaya; Toshiro Fukasawa, Shimosuwacho, both of Japan

[73] Assignee: Sankyo Kogaku Kogyo Kabushiki-Kaisha, Suwa, Japan

[22] Filed: Apr. 25, 1975

[21] Appl. No.: 571,461

[30] Foreign Application Priority Data

Apr. 27, 1974 Japan.................................. 49-47931

[52] U.S. Cl................................... 352/30; 352/27; 352/29; 352/72; 352/74; 352/78 R
[51] Int. Cl.²........................................... G03B 23/02
[58] Field of Search .................. 352/27, 29, 30, 72, 352/74, 78 R

[56] References Cited
UNITED STATES PATENTS

| | | |
|---|---|---|
| 3,825,327 | 7/1974 | Kosarko et al........................ 352/74 |
| 3,880,504 | 4/1975 | Marvin................................. 352/27 |

*Primary Examiner*—L. T. Hix
*Assistant Examiner*—Russell E. Adams, Jr.
*Attorney, Agent, or Firm*—Pollock, Vande Sande & Priddy

[57] ABSTRACT

A movie camera capable of magnetic recording on a loaded film simultaneously with filming includes a pinch roller carried by a bracket which is swingable relatively to the camera body. The pinch roller is movable relatively to the bracket. The bracket is movable in response to the closing operation of a lateral cover of the camera to a position where the pinch roller is adjacent to a capstan and restrained immovably in the position. In response to the operation of a release element for initiating recording, the pinch roller is moved by a spring member into rolling engagement with the film to urge the same into contact with the capstan for recording on the film along a recording track.

6 Claims, 5 Drawing Figures

MOVIE CAMERA CAPABLE OF MAGNETIC RECORDING SIMULTANEOUSLY WITH FILMING

BACKGROUND OF THE INVENTION

1. Field of the Invention

This invention relates to a small-sized camera and, particularly, to an improvement for a movie camera adapted to be loaded with a film cartridge which stores a roll of film coated with a magnetic recording material and to perform recording simultaneously with the filming of a scene.

2. Description of Prior Art

The cartridge adapted for use with such type of camera is provided with a cutout portion formed in one side of the outer case of the cartridge so that a part of the film stored in the cartridge is moved across a cutout portion for the purpose of recording. When the cartridge is mounted in a housing of the camera, a capstan and a magnetic recording head which are mounted on the camera body are positioned in opposed relationship to a bracket which is also mounted on the camera body and carries a pinch roller and a pad for pressing the film against the magnetic recording head. The film travels across the cutout portion and between the opposed capstan and recording head and the bracket. Thus, when the camera is loaded or unloaded with a cartridge, the bracket for the pinch roller should be pivotally retracted sufficiently so as not to interfere with the loading and unloading operation. On the other hand, when the lateral cover of the movie camera is closed, the bracket should be pivotally moved to cause the pinch roller to move to a position in which it is positioned adjacent to the capstan with the film extending therebetween and be ready for recording on the film in synchronism with the travel of the film. However, in the recording preparation position in which the cover has been closed but the film is not yet exposed, the pinch roller should be spaced from the capstan because if the pinch roller were pressed against the capstan for long time, the pressed portion of the pinch roller whose outer peripheral portion is made of a relatively soft material would be permanently deformed. The deformed pinch roller would cause malfunction of recording. Therefore, the arrangement should be such that the pinch roller on the bracket is first moved in response to the closing operation of the cover of the movie camera to a position adjacent to the capstan and then, when the release element is operated for to initiate a recording operation, the pinch roller is further moved slightly in response to the operation of the release element so that the pinch roller presses the recording track of the film against the capstan to make synchronized recording. Such an arrangement is already known in connection with a prior art camera capable of simultaneous recording.

However, in the well-known prior art camera capable of simultaneous recording, the shaft of a pinch roller is fixedly mounted on a swingable bracket. Since, in addition to the pinch roller, the bracket carries several members such as a film gate, a device for detecting the slack of travelling film and a member for preventing lateral deflection of the cartridge in the direction of the film take-up shaft, the total weight or the dead load of the bracket is substantial. When the release element of the movie camera for initiating a recording operation is actuated to move the heavy bracket from the recording-preparation position, to a recording position, an external force of a substantial magnitude is needed to operate the release element. In other words, the operation of the release element is heavy as the result of the resistance of the dead weight. Besides, the resistance to the operation of the release element, which corresponds to the dead weight of the bracket, varies depending upon the position of the camera shot, i.e., depending upon whether the camera is pointed upwardly or downwardly.

SUMMARY OF THE INVENTION

According to the invention, there is provided a movie camera capable of simultaneous recording, wherein a pinch roller is resiliently mounted by means of a weak spring on a bracket so that the roller is movable relative to the bracket, whereby, when the lateral cover of the movie camera is closed, the bracket is moved together with the pinch roller from a retracted position to a recording-preparation position and the bracket is held immovably in this position and, when the release element is operated at the time of a recording operation, the pinch roller alone is slightly resiliently moved toward a capstan. Regardless of the position of the camera while shooting, the release element can be operated by slightly moving the pinch roller against the weak spring to bring the recording mechanism of the camera into a recording position in which the recording can be made on a film which is uniformly travelling through the recording mechanism.

The above and other objects, features and advantages of the invention will be made apparent by the following description with reference to the accompanying drawings.

DETAILED DESCRIPTION OF THE INVENTION

Figure 1:
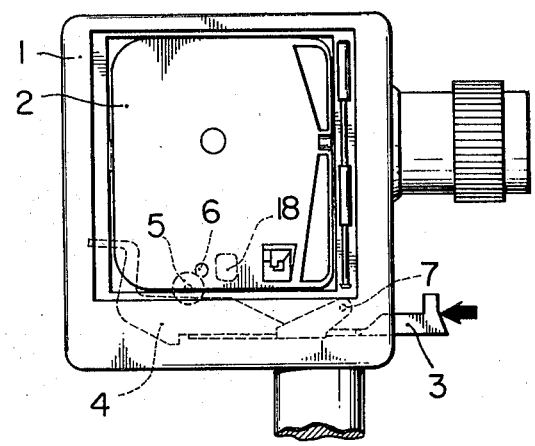
FIG. 1 is a side view of a movie camera according to the present invention which is loaded with a film cartridge and in which a lateral cover is removed to show the inner structure of the camera.

In FIG. 1 there is shown a movie camera 1 loaded with a cartridge 2 containing a film having a recording track (not shown). The camera is shown in its position in which a pinch roller 5 mounted on a bracket 4 is pressed through the film, not shown in FIG. 1, against a capstan 6 as the result of a release element 3 having been operated by an external force. It is, however, to be noted that the camera is shown in FIG. 1 with its lateral cover removed to illustrate the cartridge 2 which is supported in the camera 1. When the lateral cover is opened, the bracket 4 carrying the pinch roller 5 is retracted downwardly together with the roller 5 to a lower position in which the pinch roller 5 is separated from the capstan 6.

Figure 2:
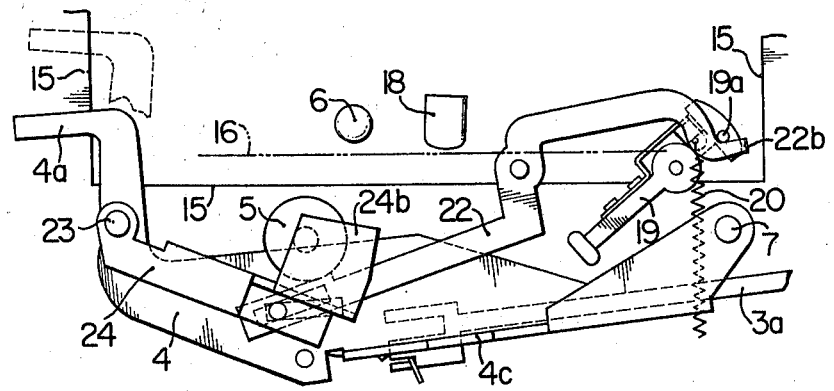
FIG. 2 is a side elevation of a recording mechanism illustrating a pinch roller in its retracted position, i.e., when the lateral cover is opened.

The bracket 4 is received in a lower space of the housing of the camera and swingably mounted on a shaft 7 which is fixedly mounted at one end on the body of the camera. On the middle section of the bracket, a plate 8 (FIGS. 4 and 5) having a shape of a sector is mounted by means of a shaft 11, extending through a hole 9, which is provided at the pivot point of the sector-shaped plate 8, and through an aligned hole 10 provided on the bracket, so that the plate 8 is swingable relative to the bracket 4. An arcuate edge of the plate 8 is guided by a roller 12 which is rotatably mounted on the bracket 4 so that lateral deviation of the plate 8 is avoided. The arcuate edge has its center of curvature coincident with the hole 9. One end of the shaft of the pinch roller 5 is fixedly fitted into an eccentric hole 13 in the plate 8. The plate 8 is bent at one end portion of the arcuate edge as shown in FIG. 5 by a reference numeral 8a. The bent portion 8a is inserted between fingers of the forked portion which is formed at one end of a linkage 3a of the release element 3. A spring 14 is mounted on the shaft 11. The spring wire of the spring 14 is engaged at one end with a hook portion 8b which is formed at the other end portion of the arcuate edge of the plate 8, and at the other end with a second hook portion 3a' which is provided at a portion of the linkage 3a adjacent to the forked portion (see FIG. 4). The solid line designated by reference numeral 15 in FIG. 2 represents a lower portion of a rim defining the opening of the camera body which is adapted to house the cartridge 2 shown in FIG. 1. The pinch roller mounting bracket 4 is disposed in the lower space of the camera body and pivotably mounted at one end on the body. Before the lateral cover of the camera is closed, the bracket 4 is located in the retracted position shown by solid lines in FIG. 2. When the lateral cover is closed, the bracket 4 is pivotally moved clockwise about the shaft 7 by a mechanism (not shown) to a position where the free end 4a of the bracket occupies a position as shown by broken line in the FIG. 2. At that position the bracket 4 is restrained immovably relative to the camera body by an auto-restraining mechanism disclosed in the specification of our copending Japanese patent application Ser. No. 47930/74.

Figure 3:
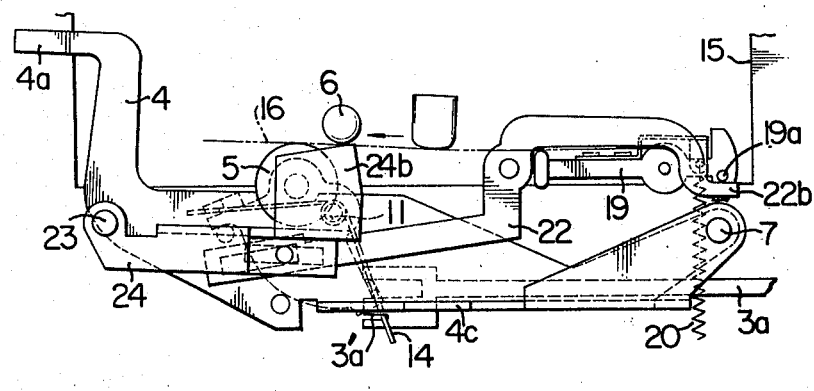
FIG. 3 is a side elevation of the recording mechanism illustrating a spaced relationship between the pinch roller and a capstan when the lateral cover is closed and the bracket is restrained in the immovable position.

When the bracket 4 is restrained in the immovable state, the relative positions of the several components are as shown in FIG. 3. In such a state, there is a slight space between the pinch roller 5 and the capstan 6 with the film 16 positioned therebetween. In this position, the spring 14 exerts only a slight force, as both ends of the spring wire abut respectively against the hook portions 3a' and 8b with slight force. As shown in FIG. 3, since the pinch roller 5 is positioned opposite to and spaced from the capstan 6 with the film 16 positioned therebetween under some tension, the plate 8 carrying the pinch roller 5 is so held that the plate 8 is capable of being rotated only slightly about the shaft 11. It is to be noted that the position shown in FIG. 3 would not vary at all even if the camera were oriented in any direction.

Figure 4:
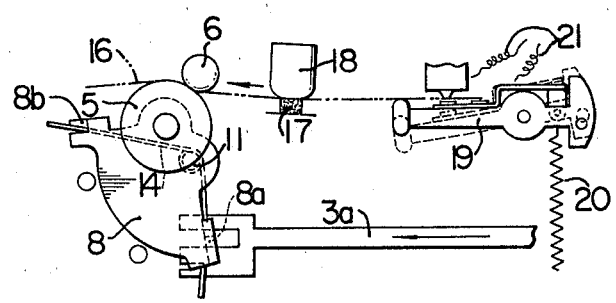
FIG. 4 is a side elevation of the recording mechanism illustrating a position in which the pinch roller presses the film against the capstan when the pinch roller on the bracket has been moved toward the capstan in response to the operation of the release element for the crank-in operation.
Figure 5:
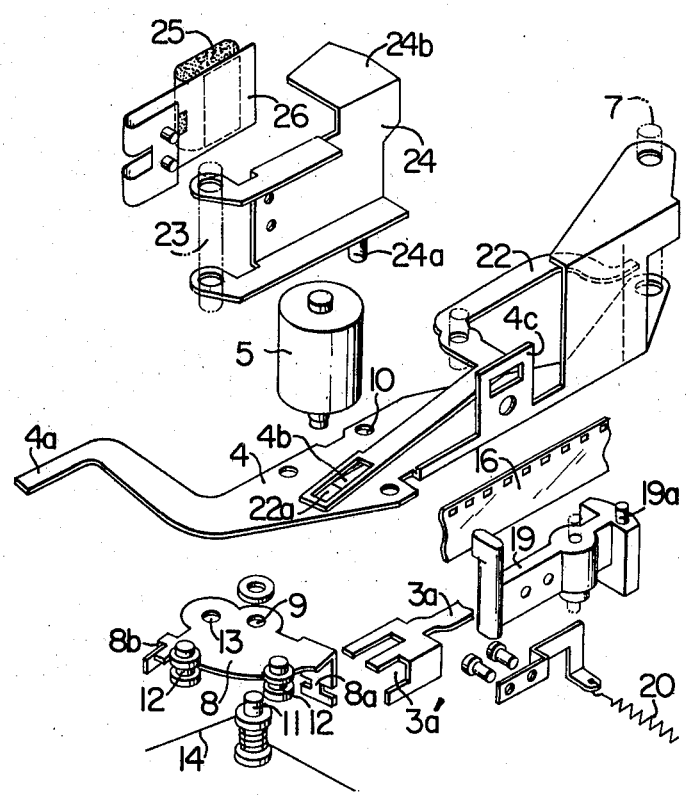
FIG. 5 is a perspective view of the recording mechanism with the movable elements thereof being shown in disassembled positions.

When the release element 3 is operated, the linkage 3a moves in the direction as indicated by an arrow in FIG. 4. The hook portion 3a' moves in a direction to reduce the included angle defined by both legs of the wire of the spring 14, so that the sector plate 8 is rotated clockwise about the shaft 11. The pinch roller 5 mounted on the sector plate 8 is slightly moved toward the capstan 6 by the resilient force of the spring 14 and pressed against the film 16 to urge the latter against the capstan 6. In this position, the film 16 is driven to travel at a uniform speed. At the same time, a pad 17 carried by the bracket 4 pushes the recording track of the film 16 against a magnetic recording head 18 for synchronized recording. After the completion of the recording, when the lateral cover of the camera is opened, the bracket 4 with pinch roller 5 is restored to the position shown in FIG. 2 so as to enable the film cartridge 2 to be easily removed from the camera body.

As will be understood from the above description, according to the present invention, the bracket carrying the pinch roller is immovably restrained with respect to the camera body when the lateral cover of the camera is closed. Then, the pinch roller is slightly moved in response to the operation of the release element relative to the bracket by means of the weak spring. By this operation alone, simultaneous recording can be made on the film. Thus, only a slight external force is needed to operate the release element for starting a filming operation and/or a recording operation, even if the camera would be oriented in any direction for shooting its object. Advantageously, the variation of the external force exerted onto the release element scarcely influences the recording operation.

In addition to the above description of the embodiment of the present invention, which will be operated when the bracket carrying the pinch roller is pivotally moved, the well-known components will be briefly discussed with reference to the accompanying drawings.

In FIGS. 2 to 4, a small lever 19 is pivotally mounted on the camera body at its fulcrum. The lever 19 is biased by means of the resilient force of a tension spring 20 connected to one end thereof and has a tendency to pivotally move clockwise so that the other end of the lever normally abuts with a light force against the film 16 travelling through the recording mechanism. A motor for driving the capstan is provided separately from a motor for intermittently driving the film. To prevent the motors from interfering with each other, an arrangement is provided to cause the film 16 to form a suitable loop before reaching the magnetic recording head 18. Therefore, the small lever 19 is preferably inclined slightly counterclockwise. If the speed of the film driving motor should decrease for some reason and the film portion engaging the other end (left end) of the lever 19 tensioned, the lever 19 will be pivotally moved clockwise to the position shown in FIG. 4 by the solid line. By this operation of the lever, a switch in a circuit 21 for accelerating the speed of the film driving motor is actuated to close the circuit to energize the motor so as to maintain synchronization between recording and shooting.

A slot 4b is provided in the middle section of the bracket 4 carrying the pinch roller 5 (see FIG. 5). A slot 22a is provided in the left-arm portion of a large lever 22 which is pivotably mounted on the camera body at its fulcrum. A pin 24a on a rocker plate 24 is loosely fitted into these two slots 4b and 22a, the rocker plate 24 being pivotable about a shaft 23 which is fixedly mounted at its one end on the camera body. The right-arm end portion 22b of the large lever 22 is engaged with a pin 19a mounted on the right-arm portion of the small lever 19 for detecting the tension in the film (see FIG. 2). The rocker plate 24 is bent at a portion 24b toward the housing storing the film cartridge.

A plate 26 carrying a light shutter member 25 is resiliently mounted on the main portion of the rocker plate 24, as shown in FIG. 5. When the lateral cover of the camera is closed as shown in FIG. 3 and the bracket and the pinch roller are held immovable relative to the camera body, the bent portion 24b of the rocker plate 24 engages the wall of the outer case of the cartridge received in the camera housing so as to frictionally hold the cartridge against movement. Thus, the surface of the recording head is kept in contact with the film in the area of the recording track thereof. A light shield member 25 prevents the film from being affected by the light. In this state, the lever 22 has been rotated clockwise, and the small lever 19 is inclined clockwise by the spring 20 to automatically detect any slack of the travelling film.

When the lateral cover of the camera is opened after completion of recording and shooting, the bracket 4 and the pinch roller are automatically moved to the retracted position shown in FIG. 2 by the solid line in response to the closing operation of the cover caused by a mechanism which is not shown in the drawings. In this state, the bent portion 24b of the rocker plate 24 releases the cartridge so that the cartridge is easily removed from the camera housing. At the same time, the right-arm end portion 22b of the large lever 22 hits the pin 19a of the small lever 19 to cause the small lever 19 to pivotally move counterclockwise out of contact with the film.

A bent piece member 4b is integrally formed on the bracket 4 carrying the pinch roller. The bent portion 4c is operatively engaged with the component of the film gate which is not shown in the drawings.

What is claimed is:

1. In a sound motion picture camera having a lateral opening through which a cartridge encasing a film is inserted and removed; a cover closing said opening; a sound recording transducer and a capstan driving said film, and a release mechanism for actuation upon initiation of a recording operation while filming; the improvement comprising:
   a pinch roller,
   a bracket pivoted in response to the closing and opening of said cover and locked in a predetermined position in response to the closing of said cover;
   a plate carrying said pinch roller, said plate being pivotally mounted on said bracket to permit said pinch roller to move relatively to said bracket;
   means responsive to the pivoting of said bracket to said predetermined position to move said pinch roller from a first normal position it assumes when said cover is open to a second position closely adjacent but not contacting said capstan,
   a spring resiliently connected between said plate and the release mechanism;
   a pad carried on said bracket for selectively urging the recording track of the film against said recording transducer,
   and means responsive to the actuation of said release mechanism for pivotally moving said plate against the force of said spring to thereby move said pinch roller to a third position in which it urges said film against said capstan.

2. The improvement as set forth in claim 1, wherein said spring is a torsion spring, one leg of which is pushed by means of said release mechanism, and the other leg of which selectively actuates said plate to pivotally move so as to urge said pinch roller against said capstan.

3. The improvement as set forth in claim 2, wherein the distance between the pivot point of said plate and the center of said pinch roller is shorter than that between the center of the spring and a point on said plate against which abuts said other leg of said spring.

4. The improvement as set forth in claim 1, wherein said release mechanism comprises a push lever which is held in operative condition when said bracket is operated.

5. The improvement as set forth in claim 1, further comprising a rocker plate for holding the cartridge encasing the film strip after closing said cover, said rocker plate being operable in response to the operation of said bracket.

6. The improvement as set forth in claim 1, further comprising a sensor for detecting a loop of the film strip, said sensor being controllably positioned in response to the operation of said bracket.

* * * * *